Feb. 4, 1964
A. O. T. OSTRUS
3,120,442
NATURAL CITRUS FRUIT AQUEOUS ESSENCE EMULSION
AND PROCESS OF MAKING THE SAME
Filed Oct. 23, 1962
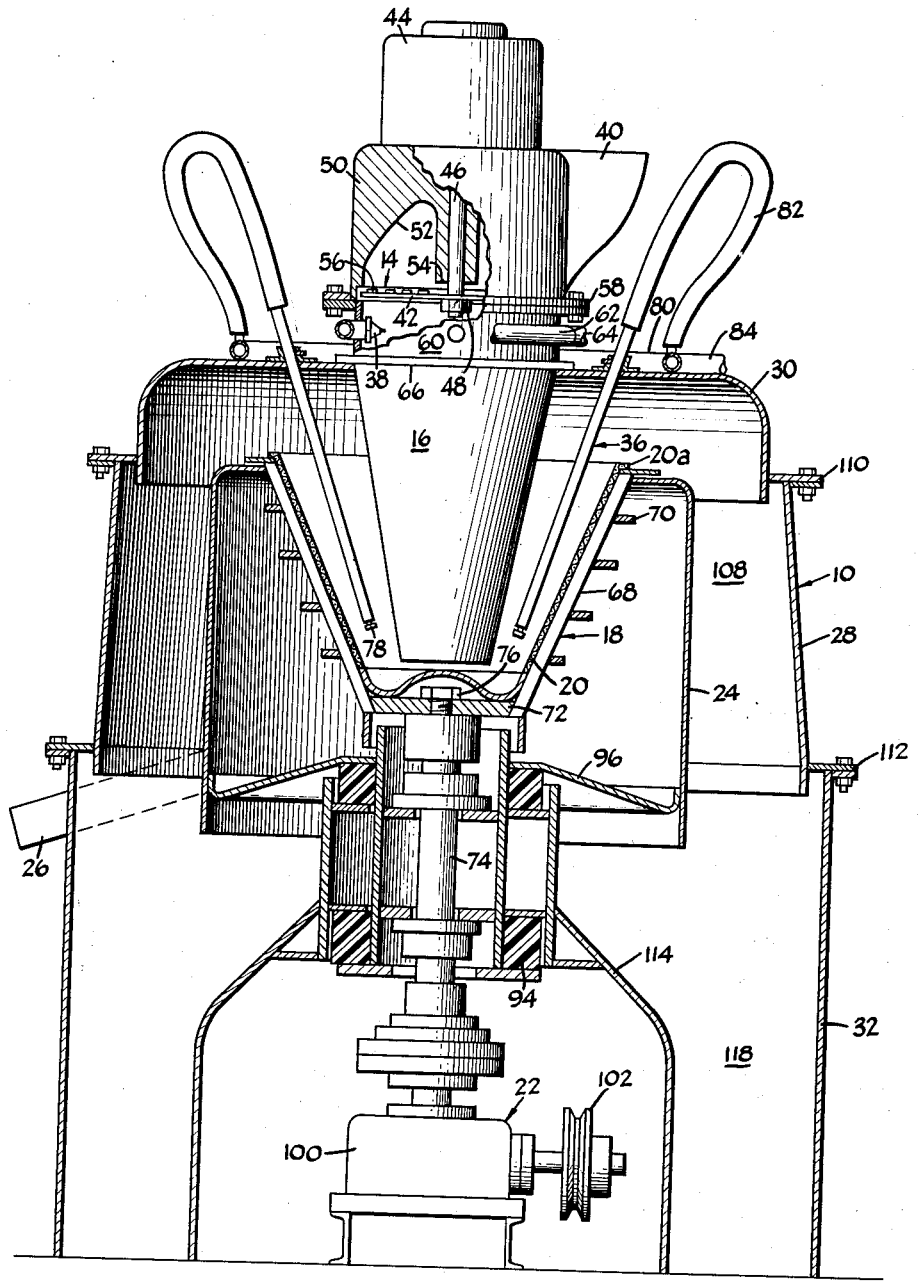
INVENTOR
*Aubrey O.T. Ostrus*
BY
ATTORNEYS United States Patent Office 3,120,442
Patented Feb. 4, 1964

3,120,442
NATURAL CITRUS FRUIT AQUEOUS ESSENCE EMULSION AND PROCESS OF MAKING THE SAME
Aubrey O. T. Ostrus, Los Angeles, Calif., assignor to Freshway Products Company, Los Angeles, Calif., a corporation of California
Filed Oct. 23, 1962, Ser. No. 232,553
8 Claims. (Cl. 99—103)

This invention relates to a natural citrus fruit aqueous essence emulsion and to a process of making the same. More particularly, the invention relates to an aqueous oil-in-water type of emulsion prepared from the natural citrus fruit and consisting essentially of the constituents of the citrus fruit, including the recoverable volatile oil content thereof, in their natural state, without substantial alteration of their respective chemical entities or their relative proportions one to another.

In my pending application Serial No. 9,820, filed February 19, 1960, of which the present is a continuation-in-part application, I have described and claimed a continuous method of treating citrus fruit, in accordance with which the fruit is finely sub-divided in a cutting or shredding operation; the resulting sub-divided mass is immediately sprayed with an aqueous liquid to entrain the volatile oils and fluids released from the fruit and to form a flowable mass thereof; such flowable mass is subjected to a continuous centrifugal filtering action to remove solid portions therefrom and to give a filtrate containing the flavor and other fluids from the fruit; and the filtrate is recovered. Either the whole citrus fruit or the hulls of the citrus fruit could be used as the starting material.

Since I have now found that the flavedo is the portion of the peel containing the constituents, including the volatile oils, that are most important for the purposes of my present invention, my preferred source material is either citrus fruit peel as obtained after removal of the juice cells from the whole fruit, or after removal of both the juice cells and also all or a part of the albedo, or mesocarp. The term "peel" as used herein is therefore intended to mean and to include the flavedo, with or without the albedo portion. The albedo is the white, spongy, parenchymatous layer on the inside of the hull. It is the peel that contains most of the recoverable volatile oil of the citrus fruit. While freshly expressed citrus juices contain in very minor proportions certain oily substances that are responsible for their characteristic aroma, those substances are distinctly different in composition from the essential oils of the corresponding peel. I have found that for certain purposes, which will be described more fully hereinafter, best results can be obtained by applying my process to the peel only, rather than to the whole fruit. In some instances, peel that would otherwise go to waste can be used, thereby effecting a considerable saving, but where it is necessary to start with the whole fruit, the juices of the fruit may be first expressed and separately recovered either for use as such, or after being concentrated by distillation or by low temperature vacuum evaporation, and/or by freezing, for use in concentrated liquid or frozen form.

Where the concentration of citrus fruit juices is effected by either high or low temperature distillation or evaporation, there is an unavoidable loss of some of the delicate aroma of the natural, freshly expressed fruit juice, and this loss is considerably greater where, in accordance with present practices, a higher degree of concentration of the fruit juice is effected. In those cases where the concentration is such as to impart to the citrus fruit juice concentrate a Brix value of from 33° up to as high as 72°, there is such a noticeable loss of the flavor quality, or aroma, of the product that it has become customary to add to the concentrate a sufficient quantity of unconcentrated freshly expressed fruit juice to compensate for such loss. In some cases, it is the practice to add to the concentrate a small proportion of volatile oils derived from the peel by cold pressing, and/or other ingredients to fortify the taste and flavor of the resulting product. These additions have thus far not been found to be entirely satisfactory as to palatability and taste from the standpoint of consumer acceptability.

It is therefore one of the objects of my present invention to provide an aqueous essence emulsion of the natural constituents of the peel of citrus fruits, which contains such constituents, including recoverable volatile oils, in substantially their original natural state and in a concentration particularly adapting the emulsion for addition to frozen citrus fruit concentrates and the like.

It is a further important object of this invention to provide an aqueous essence emulsion derived directly from citrus fruit peel without the use of added chemical emulsifying or treating agents and without the application of any substantial amount of heat, yet of such concentration as to be suitable to use directly, or upon dilution, in the making of food products, confections and the like.

It is a further important object of this invention to provide an aqueous essence emulsion derived from citrus fruit peel that has superior flavor and keeping qualities and that contains virtually all of the natural constituents of the citrus fruit peel unchanged by the use of any heat process and in relatively high concentrations in terms of the recoverable volatile oil content of the emulsion.

Other and further important objects and advantages of my invention will become apparent as the description proceeds in accordance with the drawings, in which:

The figure is a vertical sectional view, partly in elevation, of apparatus suitable for carrying out the method for producing the composition of my invention.

As shown on the drawings:

The reference numeral 10 indicates generally a machine that is suitable for use in recovering an aqueous essence emulsion from the peel, of citrus fruit, such as oranges, lemons, limes and the like. The peels are fed into a suitably contoured inlet 40 at the top of the machine 10 toward a cutting station 14. From the inlet 40, the peels pass through a volute chamber 52 in the housing 50 toward the base 54 of such housing. The cutter station 14 positioned below said base 54 comprises a rotary disk 42 attached to the lower end of a drive shaft 46 by means of a nut 48 and driven by a motor 44 at speeds in the neighborhood of 1750 r.p.m. The disk 42 carries a plurality of radially extending, spaced sets of teeth 56 which extend upwardly from the plane of the disk 42 a distance of about 20/1000 of an inch, the disk being formed with radially extending openings between each successive sets of teeth to permit the shredded materials to pass through the disk directly into the upper end of a downwardly converging feed pipe 16.

The cutting mechanism 14 is desirably located at a flanged connection 58 between the upper housing 50 and a cylindrical flanged member 60 forming an extension of the upper end of the feed pipe 16. Spray nozzles 38, connected to a spray header 62, extend inwardly through the cylindrical extension 60 for the optional spraying of the shredded fruit mass as the same is projected downwardly from the cutter mechanism 14 into the upper end of the feed pipe 16. Four such nozzles 38 may be equally disposed angularly around the cylindrical extension 60 and supplied by the circular header, or manifold 62 surrounding said extension 60 and connected to an inlet 64.

By means of such spray nozzles 38, an aqueous liquid, preferably water, itself, can be directed against the subdivided fruit mass substantially simultaneously with the production thereof at the cutter mechanism 14 to entrain and thereby capture the volatile oils and other flavoring fluids immediately upon their release from the peel. There is thus little loss of the volatile oils and flavor constituents of the natural citrus fruit peel. Such spraying is desirable for effecting the highest possible recovery of volatile oils and flavor constituents.

The feed pipe 16 is in the shape of an inverted frustrum of a cone, open at both ends, with an upper external flange 66 resting on the supporting surface supplied by a cover portion 30 of the machine 10. Said feed pipe 16 extends into a basket-type of a centrifugal filter, indicated generally by the reference numeral 18. The feed pipe 16 extends coaxially into the filter 18 with its open end in spaced relation to the bottom thereof. Said filter 18 is constructed in the form of an upwardly and outwardly inclined frusto-conical basket, externally reinforced by annular ribs 70 and interconnected longitudinally extending ribs 68 united at their lower ends to an imperforate hub 72. A conforming foraminous basket, or screen, 20 is positioned against the inner surfaces of the ribs 68 to provide the desired filtering action.

The hub 72 is connected to the upper end of a drive shaft 74, as by means of a fastening bolt 76, so as to be driven by a motor structure 22 that includes reduction gearing within a housing 100 and a driving sheave or pulley 102. The drive shaft 74 and attached filter are preferably rotated at speeds from 350 to 470 r.p.m. so as to effect a centrifugal filtering action by virtue of which the liquids pass through the foraminous basket or screen 20 while the non-filterable solids are progressively moved upwardly along the surface of said screen 20 and outwardly over the open annular edge 20a thereof for discharge into the annular passage 108.

Additional spray water can be introduced at the filter 18 through nozzles 78 positioned at the lower ends of pipes 36 near the bottom of the filter basket 20. The water is introduced through an inlet 84 to conduits 82 and thence to the pipes 36. Said nozzles 78 are effective to direct a fan-shaped spray toward the solids on the surface of the foraminous basket 20 for removing further flavoring materials from the partially purged solids thereon before such solids are discharged over the rim 20a.

Due to the high efficiency of the centrifugal filtering action, sprays at this location are not absolutely essential to the satisfactory carrying out of my method.

In addition to the cover portion 30, the outer casing of the machine 10 includes a skirt portion 28 secured by means of flanges 110 to said cover portion 30, and a lower skirt portion 32 secured by means of flanges 112 to said skirt portion 28. The rejected solids portion from the filter 18 flows outwardly over the upper surface of the casing 24 and downwardly between said casing 24 and said intermediate skirt portion 28 into a collecting zone 118 within the lower casing portion 32. The filtrate from the filter 18 passes into the annular space provided by the casing 24 and an inner bottom-forming, annular casing portion 96. From such juice-collecting zone, the filtrate is discharged through an outlet pipe 26 into a suitable collector (not shown).

The apparatus described has been found suitable for carrying out the method of my invention as a continuous process for the making of relatively stable, high potency, oil-in-water type emulsions of the natural constituents of citrus fruit. When the peel, alone, is used as the starting material, an aqueous essence emulsion can be obtained that is both stable as to non-settling properties and also as to keeping qualities, and that has a relatively high potency in terms of its recoverable volatile oil content. In general, depending upon the particular source of material and whether or not aqueous sprays are used in the carrying out of the process, an aqueous essence emulsion containing from 0.25 to 3.0 milliliters, and over, of recoverable volatile oil per 100 milliliters of the emulsion may be obtained. These volume percentage figures are those that have actually been obtained by testing of the concentrate in accordance with the standard distillation method of the United States Department of Agriculture for determining recoverable oil in citrus fruit products. As contrasted with volatile recoverable oil compositions obtained by cold pressing methods, the aqueous essence emulsion of my present invention has better flavor and aroma properties, being free from any bitter principles, and has greater keeping stability, probably due to the natural anti-oxidants and the like naturally occurring in the citrus fruit peel and retained in the concentrate recovered in the method of my process.

Where it is desired to obtain a concentrate having from 2.5 to 3.0 volume percent of recoverable volatile oils, this can readily be done without the use of aqueous sprays, or with a minimum use thereof, and the resulting aqueous essence emulsion will have a Brix of approximately 8 to 10° (at 20.0° C.) without the addition thereto of any extraneous water-soluble substance, such as sugar. If a concentrate having as low as 0.25% of recoverable volatile oil is desired, the corresponding Brix value will be between 0.75 and 1°. In the case of orange peel, the aqueous emulsion will have normally an acidity equivalent to 0.3 to 0.5% by weight of citric acid, as determined by the standard phenolphthalein titration method using 0.1 N sodium hydroxide (NaOH).

Where it is desired to convert the aqueous essence emulsion of my invention into a drink of the desired flavor properties, the emulsion is diluted with sufficient water to make the equivalent of an orange drink containing approximately 0.025% by volume of recoverable volatile oil. For instance, if the aqueous essence emulsion contains 1 volume percent of recoverable volatile oil, one part of the emulsion would be diluted with 39 parts of water to give a concentration of 0.025 volume percent of recoverable volatile oil in the finished drink, while if the emulsion contained three volume percent of recoverable volatile oil, the dilution with water would be such as to make one part of emulsion up to a total of 120 parts by volume. These initial concentrations of recoverable volatile oil of one volume percent and higher are much greater than have heretofore been possible by the use of prior art processes, such, for instance, as that disclosed in the Hill Patent No. 2,086,911. Also, my aqueous essence emulsion, when produced from the peel only, rather than from the whole fruit, has unexpectedly better keeping properties than the base produced from the whole fruit, by a process such as disclosed in the Hill patent. As indicative of the excellent stability of the emulsion, my aqueous essence emulsion, without the addition of any emulsifying agent, exhibits no separation when added to orange concentrates upon freezing and subsequent thawing of the frozen concentrate.

As examples of the quantities of peel necessary to give 1 gallon of my aqueous essence emulsion of varying recoverable volatile oil content, the following are given:

*Example 1*

[1 gal. of 1 vol. percent oil]

20–25 pounds of orange peel were subjected to the process hereinabove described while controlling the amount of water sprayed through the nozzles 38 and/or 78 to give an aqueous essential emulsion having a recoverable volatile oil content of 1 vol. percent.

*Example 2*

[1 gal. of 3 vol. percent oil]

60–75 pounds of orange peel were processed as described, but without the use of any spray water, or else only sufficient amount of spray water, to give an aqueous emulsion having a recoverable oil content of 3 vol. percent.

Since the recoverable oil content of citrus fruit peel will vary with the type of citrus fruit and also with the species selected of any particular type, whether oranges, lemons or other type, no exact quantities of peel and of spray water can be specified for giving a specific volume percent of recoverable volatile oil in the resulting aqueous essence emulsion. The foregoing examples are therefore intended to be merely illustrative.

Where it is desired to impart the natural taste and aroma to a citrus fruit juice reconstituted from a citrus fruit concentrate of 33 to 72° Brix that is deficient in recoverable volatile oil content, a sufficient quantity of my aqueous essence emulsion is added to the concentrate, at the time it is prepared and before freezing, to give approximately 0.02 vol. percent of recoverable volatile oil in the reconstituted juice. This would mean, in the case of an orange juice concentrate of 42° Brix, adding a sufficient amount of my aqueous essence emulsion to bring the recoverable volatile oil content of the concentrate up to 0.08 vol. percent. Then, upon 3 to 1 dilution of the concentrate, the resulting reconstituted orange juice would contain 0.02 vol. percent of volatile recoverable oil. Such a result cannot be obtained by adding fresh citrus juice, itself, to a concentrate, since such juice normally contains only about 0.02 vol. percent of recoverable volatile oil.

While reference has been made to particular uses of my essence emulsion, it will be understood that the emulsion can be used in the making of any citrus products where a citrus flavor material is needed, as in the making of sherbets and ices, toppings and other confections, and pureés and the like.

I claim as my invention:

1. The method of treating citrus fruit peel, which comprises
   shredding such fruit peel in such manner as to effect the downward separation and release therefrom of shredded portions and the flavor and other fluids contained therein, spraying said shredded portions and the flavor and other fluids simultaneously upon their release with an aqueous fluid to form therewith a flowable mass,
   subjecting said flowable mass to a centrifuging and filtering action to effect separation and removal of the non-filterable portion of said mass from the situs of said filtering action, and recovering the resultant filtrate in the form of an aqueous essence emulsion containing the flavor and other fluids from said fruit.

2. The method of treating citrus fruit produce, comprising the steps of
   rapidly subdividing the produce,
   simultaneously spraying the produce at the locus of subdivision to produce a flowable mass including the subdivided produce, flavors and other fluids thereof,
   subjecting said flowable mass to a centrifuging and filtering action to effect separation and removal of the non-filterable portion of said mass from the situs of said filtering section, and
   recovering the resultant filtrate in the form of an aqueous essence emulsion containing said flavor and other fluids.

3. The method according to claim 2, wherein said centrifuging action produces an upward and outward movement of non-filterable portions of the mass from the situs of said filtering action to give a continuous filtering action.

4. A method of treating citrus fruit peel, which comprises as a continuous process,
   shredding said fruit peel,
   entraining the shredded fruit peel in a spray of an aqueous liquid to produce a flowable mass,
   subjecting said flowable mass directly and progressively to a simultaneous centrifuging and filtering action to effect separation and removal of the non-filterable solid portion of the mass from the situs of such filtering action, and
   recovering the resulting filtrate in the form of an aqueous essence emulsion containing the flavor and other fluids from said fruit.

5. The method of treating citrus fruit, which comprises, as a continuous process
   finely subdividing citrus fruit peel by a cutting operation,
   spraying said subdivided peel with an aqueous liquid upon subdivision thereof to effect entrainment in said liquid of volatile oils released from said fruit and to form a flowable mass containing the subdivided peel and released flavor and other fluids,
   subjecting said flowable mass in a filtering zone to a filtering action to continuously filter out and remove solid portions of said flowable mass from said filtering zone, and
   continuously recovering from said filtering zone the resulting filtrate in the form of an aqueous essence emulsion containing said flavor and other fluids from said fruit.

6. The method as defined by claim 5, in which the aqueous liquid is adjusted in direct proportion to the quantity of fruit peel being subdivided to give a resulting filtrate in the form of an aqueous essence emulsion containing at least 0.25 vol. percent of recoverable volatile oils.

7. As a composition of matter:
   an aqueous essence emulsion derived by the method of claim 5,
   said emulsion consisting essentially of substantially all of the natural fluid constituents of said peel and including at least 0.25 vol. percent of recoverable volatile oil, with said natural fluid constituents being present in substantially the same proportions relative to one another as in the peel from which derived, said emulsion being a relatively stable dispersion of the oil-in-water type and having superior keeping qualities as compared to juice derived wholly from the fruit sections of the same citrus fruit.

8. As a composition of matter, an admixture of
   a citrus fruit juice concentrate of from 33 to 72° Brix that is deficient in recoverable volatile oil content and flavor qualities, and
   a sufficient quantity of an aqueous essence emulsion derived by the method of claim 6 to impart to a reconstituted juice made from the resulting admixture a recoverable volatile oil content of approximately 0.02 vol. percent.

References Cited in the file of this patent
UNITED STATES PATENTS

| | | |
|---|---|---|
| 1,097,607 | Ames | May 26, 1914 |
| 1,715,932 | Kokatnur | June 4, 1929 |
| 2,086,911 | Hill | July 13, 1937 |
| 2,935,407 | Haman | May 3, 1960 |